Feb. 2, 1943.                K. TÖFFLINGER                2,310,131
                  WINDINGS FOR SINGLE-PHASE SERIES MOTORS
                         Filed Oct. 16, 1940          2 Sheets-Sheet 2
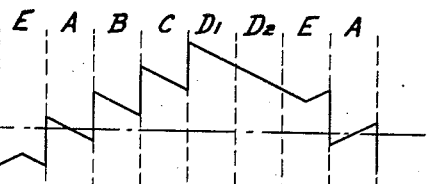
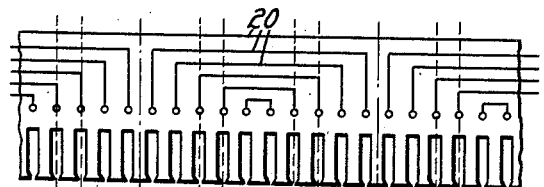
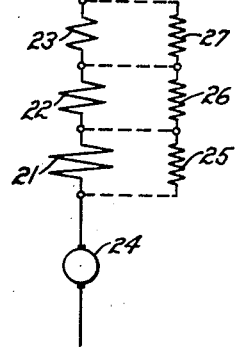
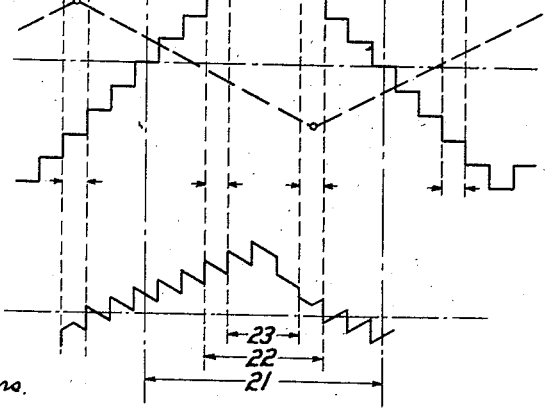
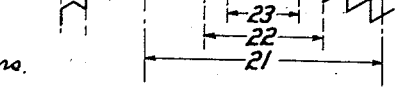
WITNESSES:
Wm. B. Sellers.
F. P. Lyle
INVENTOR
Karl Töfflinger.
BY O.B. Buchanan
ATTORNEY Patented Feb. 2, 1943

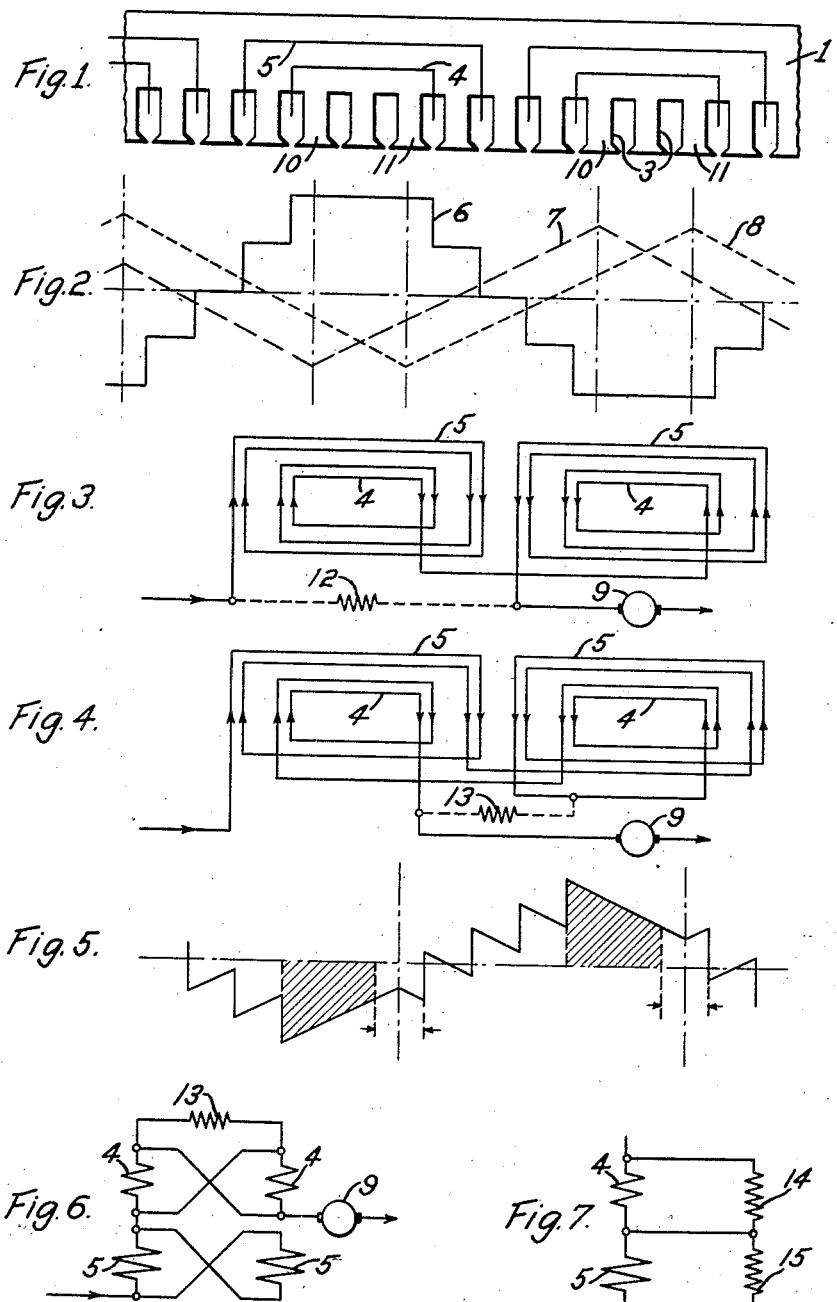

2,310,131

UNITED STATES PATENT OFFICE 2,310,131

WINDING FOR SINGLE-PHASE SERIES MOTORS

Karl Töfflinger, Berlin, Germany, assignor to Westinghouse Electric & Manufacturing Company, East Pittsburgh, Pa., a corporation of Pennsylvania Application October 16, 1940, Serial No. 361,337
In Germany July 25, 1939

8 Claims. (Cl. 172—276)

The present invention relates to alternating current single-phase series motors, and more particularly to the primary or stator windings of such machines.

Single-phase series motors have been built with a single distributed stator winding which is designed to serve the three functions of providing a main field, a compensating field, and a commutating field. This type of winding results in a very economical construction since the dimensions of the machine for a given rating can be made quite small, but it has the disadvantage that it is not possible to adjust the commutating flux to the correct value for obtaining perfect commutation. In order to overcome this difficulty, it has been proposed to provide an auxiliary commutating winding in machines of this type for controlling the commutating flux, but such an arrangement is only possible on motors of relatively large size, and is not practical for smaller machines such as the motors which are used for driving the auxiliary equipment on electric locomotives.

It is the principal object of the present invention to provide a distributed stator winding for single-phase series motors which will permit the commutating field to be adjusted to the desired value for perfect commutation without the use of any auxiliary windings.

A further object of the invention is to provide a stator winding for series motors which has two or more groups of coils connected in series, each of the groups including coils lying in corresponding positions in different poles of the winding, together with means for causing the current in different coil groups to differ in phase and magnitude so that the flux produced by the winding in the commutating zones can be adjusted to the desired value for good commutation.

More specifically, the object of the invention is to provide a winding for single-phase series motors in which each pole of the winding comprises concentrically disposed coils of different widths with the corresponding coils of different poles connected together to form coil groups which are connected in series, and with means, such as an impedance device, connected to at least one of the coil groups to cause its current to differ in magnitude and phase from that in the remainder of the winding.

Further objects and advantages of the invention will be apparent from the following detailed description, taken in connection with the accompanying drawings, in which:

Figure 1 is a diagrammatic developed view of the stator of a single-phase motor showing the arrangement of the winding.

Fig. 2 is a diagram showing the flux distribution in the air gap.

Fig. 3 is a wiring diagram showing a previously used connection of the winding.

Fig. 4 is a similar diagram showing the connection of the winding according to the present invention.

Fig. 5 is a diagram showing the resultant flux distribution produced by the winding of Fig. 4.

Figs. 6 and 7 are wiring diagrams showing further embodiments of the invention.

Figs. 8a to 8e, inclusive, are a series of vector diagrams showing the flux components corresponding to each zone of the winding.

Fig. 9 is a vector diagram showing the main field flux of the motor.

Fig. 10a is a diagram similar to Fig. 1 showing a somewhat different arrangement of coils.

Figs. 10b and 10c are diagrams similar to Figs. 2 and 5, respectively, showing the flux distribution produced by the winding of Fig. 10a; and Fig. 11 is a wiring diagram showing the application of the present invention to the winding of Fig. 10a.

Figure 1 shows diagrammatically the preferred arrangement of the coils in a distributed single-phase winding. In this figure the developed stator core is indicated at 1, having a plurality of suitably shaped slots 3. The coil sides of any suitable type of coils 4 and 5 are placed in the slots and the coils are connected together to form the winding. It will be seen that each pole of the winding comprises an inner coil 4 and an outer coil 5, the coils being arranged concentrically and the outer coil 5 being of greater width or pitch than the inner coil 4. It will be understood, of course, that each coil may have as many turns as are necessary or desirable.

Fig. 2 shows the flux distribution obtained from this winding, neglecting the effects of saturation. The solid curve 6 shows the flux produced by the winding shown in Fig. 1, while the dotted curves 7 and 8 indicate the fluxes produced by the armature current for opposite directions of rotation of the armature.

Single-phase windings of the type described have usually been connected as shown in Fig. 3 with the inner and outer coils 4 and 5 of each pole connected in series, and the coils of successive poles also connected in series, the armature 9 of the motor being in series with the winding. It will be obvious from this figure that when the winding is connected in this manner it is not possible to control the flux through the stator teeth 10 and 11, which act as commutating poles, since the same current flows through all the coils in series, and for this reason it is extremely difficult, if not impossible, to obtain satisfactory commutation with this type of winding except at very light loads.

It is possible to somewhat improve the commutation by connecting a resistor 12 across the winding in order to modify the current through the windings and thus affect the flux distribution. This expedient is very undesirable, however, and can be used only in special cases, since it results in a very uneconomical construction of the motor. The voltage drop across the entire stator winding is relatively high, being as much as 40% of the terminal voltage in small motors, and for this reason the losses in a resistor connected across the entire winding are very high if any appreciable amount of current flows through it. The use of such a resistor also has the disadvantage that the flux is caused to lag behind the current, which results in a decrease in the torque developed by the motor, although the power factor is somewhat improved. Because of these disadvantages this expedient has not been used in practice, and when a distributed winding of this type is used no attempt has been made to compensate for the induced electromotive force in the coils undergoing commutation. This limits the application of such motors since they can only be relatively lightly loaded and the dimensions of the motor must therefore be made rather large for a given rating so that the advantage of the distributed winding is lost.

Fig. 4 shows the connection of a winding of the type described above in accordance with the present invention. It will be seen from this figure that the outer coils 5 of all the poles of the winding are connected in series to form one coil group, and that the inner coils 4 of all the poles are also connected in series to form another coil group, the two coil groups being connected in series with the armature 9 of the motor. In order to obtain the desired result of improving the commutation, a resistor or impedance device 13 is connected in parallel with the coil group consisting of the inner coils 4. With this arrangement, the current in the latter coil group differs both in magnitude and in phase from the current in the other coil group, and by proper selection of the impedance device 13 it is possible to obtain the desired value of the flux in the commutating zone.

The resultant flux distribution in the air gap produced by this winding is shown in Fig. 5, which is obtained by the summation of the stator flux and armature flux as shown in Fig. 2. This curve shows the effective value of ampere-turns at each point, which corresponds to the magnitude of the flux on the assumption that there is no saturation in the core and that the machine has an air gap of constant width. It will be apparent that the effect of the impedance 13 connected across the coil group consisting of the inner coils 4 of each pole is limited to the shaded areas of Fig. 5, and thus by properly selecting the impedance the value of the flux in these regions, which correspond to the commutating zones, can be adjusted to any desired value.

The arrangement shown in Fig. 4 has the advantage over that of Fig. 3 that the voltage across the impedance 13 is reduced by more than half, so that in general it will not exceed 15% of the motor terminal voltage. For this reason, the losses in the impedance are relatively quite low and the efficiency of the machine is only slightly affected. It will also be apparent from Fig. 5 that the damping effect of the impedance 13 on the main field occurs exactly in those regions in which a peak occurs in the ampere-turn diagram. Such a peak may be very undesirable since it leads to local saturation of the iron and also because the iron losses of the machine are proportional to the square of the peak value of flux density. Thus, by reducing this peak value a large reduction in the iron losses is obtained which is reflected in an improved efficiency. The torque of the motor, however, is proportional to the average value of the flux so that it is not decreased to the same extent by reduction in the peak value of the flux. Another advantage of the present invention is that the phase displacement of the main field is much less than in the known connection of Fig. 3. This has the result that the loss in torque caused by the phase displacement is reduced, and thus the connection of Fig. 4 gives a higher torque than that of Fig. 3 with a considerable reduction in the iron losses. The power factor of a motor using the winding of Fig. 4 remains quite high and is higher than that of the conventional types of series motors using separate exciting windings, compensating windings and commutating windings. The higher power factor also has the advantage that the current is reduced and thus a smaller cross-section of copper may be employed for the winding.

The advantages of the winding connection of the present invention result from the fact that the magnitude and phase of the commutating field can be controlled so as to produce the correct conditions for perfect commutation while at the same time the main field is only slightly affected, and this may be done without seriously decreasing either the efficiency of the motor or the torque developed by it and with a good power factor.

It should be apparent that although the invention has been described thus far with reference to a two-pole machine, it may be applied equally well to machines having any number of poles. The invention may also be applied to various arrangements of the winding and is not limited to the exact connection shown in Fig. 4. Fig. 6 shows a connection in which the individual coils 4 and 5 forming the coil groups are connected in parallel rather than in series. Thus, the inner coils 4 of all the poles are connected in parallel to form one coil group, while the outer coils 5 are connected in parallel to form another coil group, the two coil groups being connected in series as before. A resistance or impedance 13 is again connected across the coil group consisting of the inner coils 4. It will be obvious that the effect of this connection is the same as that described above.

The invention has been described so far with reference to coils which have the same number of turns. This will usually be the case, but in certain instances it may be necessary to employ dissimilar coils. Thus, if the commutating field is too strong, a parallel resistance would have to be used which would have too high losses to be satisfactory. In such cases, the inner coils 4 may have a smaller number of turns than the outer coils in order to obtain the correct magnitude of the commutating flux. It is also possible that a large phase displacement of the main flux with respect to the current must be obtained in order to improve the power factor. This result can be accomplished by decreasing the number of turns of the outer coils 5. Similar effects can be obtained by connecting all of the outer coils together with a few turns of the inner coils in one coil group, while the remaining turns of the inner coils are connected as described above to form the second coil group. The converse of this arrangement may also be used, if necessary, by connecting a few turns of the outer coils in the coil group formed by the inner coils. In this way, different connections of the winding can be obtained which will give any desired value and phase relation, both to the main flux of the machine and to the commutating flux.

A further possibility for controlling the fluxes in the machine in any desired manner is illustrated in Fig. 7. For simplicity of illustration, the coil groups in this figure are illustrated as single windings 4 and 5, although it will be understood that each of them consists of coils lying in different poles as previously described. In this case an impedance 14 is connected across the coil group 4 and a second impedance 15 is connected across the coil group 5. The two impedances 14 and 15 are selected with different characteristics so that a desired relation of the magnitude and phase of the currents in the two coil groups can be obtained. For example, the impedance 14 may be made a pure ohmic resistance while the impedance 15 may be made highly inductive to give the desired relation of the currents in the two windings. It will be obvious, that by a suitable choice of the characteristics of the devices 14 and 15 any desired value of the commutating field can be obtained, and any suitable relation between the commutating field and the main field may also be obtained. It is to be understood that the devices 14 and 15 may be resistors of any type, or they may be reactors, or any other devices which will affect the current in the coils across which they are connected and the term "impedance device" is to be understood as including all such devices. It is also possible to use other means of affecting the currents in the coil groups, such as an auxiliary source of current connected to one or both of the coil groups to provide a resultant current in one of them which is different from that in the other.

A complete understanding of the invention will be facilitated by consideration of the vector diagrams of Figs. 8b to 8e, which illustrate the various flux components in each zone of the winding. Fig. 8a is a curve showing the resultant flux distribution in the air gap and is similar to the curve shown in Fig. 5. For convenience, the winding has been divided into a plurality of zones, indicated by the letters A to E, and the separate vectors for the flux components in each of these zones are shown. Thus, Fig. 8b shows the vectors for the flux produced by the armature, which correspond to the dotted curves in Fig. 2. Figs. 8c and 8d show the flux components produced by the outer coils 4 and the inner coils 5, respectively, assuming that the parallel impedance device is so selected that the current in the outer coils is slightly leading with respect to the current in the inner coils. Fig. 8e shows the resultant vectors representing the effective flux in each zone of the field, and it will be seen from this figure that in the commutating zones, indicated by E, a small lagging flux is provided, the exact value and magnitude of which can be controlled to give perfect commutation by properly selecting the parallel impedance device.

The resultant vector for the main field is obtained by the summation of the individual resultant flux components in the several zones, and this summation is shown in Fig. 9, the resultant main flux being represented by the vector 16. It will be seen that the main field is only slightly lagging, while the flux component which constitutes the commutating field in the zones E is considerably more lagging in order to obtain the desired compensation for the induced E. M. F. in the coils being commutated. It will be apparent therefore that the invention makes it possible to determine the phase angles of the main field and of the component of the field which constitutes the commutating flux practically independently of each other.

The invention has been described so far with reference to motors having only two coils per pole, but it is also applicable to motors having any number of coils per pole. Thus Fig. 10a shows diagrammatically a machine having a plurality of coils 20 to each pole. It will be seen that these coils are of different widths and are arranged concentrically as in the winding previously described. Fig. 10b shows the resultant ampere-turns produced by this winding which is also the curve of flux distribution if the effects of saturation are neglected. The dotted curve in this figure indicates the flux produced by the armature. Fig. 10c shows the resultant flux distribution in the air gap and corresponds to Fig. 5 described above.

With this winding the coils lying in each pole of the winding may be divided into three groups. The first group 21 consists of the coils whose widths are equal to or greater than the outside limits of the commutating zones, which are indicated by the vertical dotted lines in Fig. 10. These coils provide flux both for the main field and the commutating field, and correspond to the outer coils 5 of Fig. 4. A second group of coils 22 includes the coils whose width is within the limits of the commutating zone. In general, this group will consist of only a single coil which excites the commutating field and a small part of the main field similarly to the coils 4 of Fig. 4. Finally, a third group of coils 23 consists of those whose width is equal to or less than the distance between the inner limits of the commutating zone. These coils furnish flux for the main field, and to a small extent for the commutating field. The coil group 23 makes it possible easily to control the phase position and magnitude of the main field without disadvantageously affecting the commutating field.

There is fundamentally no essential difference between the winding of Fig. 10a and the winding previously described in connection with Fig. 4. The individual coils forming each of the coil groups may be connected together either in series or in parallel as before, all the corresponding coils in each pole of the winding being connected together in the several groups 21, 22 and 23, and the groups being then connected in series. This connection is illustrated in Fig. 11 in which the three groups of coils 21, 22 and 23 are connected in series with the armature 24 of the motor, and impedance devices 25, 26 and 27 are connected across each of the three groups of coils. As explained previously in connection with Fig. 7, the values of these impedances are selected to produce the desired relation of the currents in the several groups of coils so as to obtain the necessary commutating field.

It will be apparent therefore that a connection has been provided for a single stator winding for single-phase series motors which makes possible a very simple arrangement of the winding, and which also makes it possible to control the flux component which represents the commutating field in such a manner as to obtain practically perfect commutation, since both the magnitude and phase position of this flux component can be controlled by proper selection of the shunting impedance devices without materially affecting the magnitude or phase of the main field, and thus the operating characteristics of the motor are not adversely affected while its commutation can be made practically perfect.

It is to be understood that although certain specific embodiments of the invention have been illustrated and described, it is not limited to the particular arrangements shown, but in its broadest aspect, it includes all equivalent modifications and embodiments which come within the scope of the appended claims.

I claim as my invention:

1. In an alternating-current, single-phase series motor having a stator member and a rotor member, a plurality of motor-winding coils carried by said stator members, said coils being connected together in series and being disposed on the stator to form a single multi-polar main exciting winding for the motor, and means connected across a part of said winding to modify the magnitude and phase of the current therein, said part of the winding including coils lying in corresponding positions in different poles of the winding.

2. In an alternating-current, single-phase series motor having a stator member and a rotor member, a plurality of motor-winding coils carried by said stator members, said coils being connected together in series and being disposed on the stator to form a single multi-polar main exciting winding for the motor, and an impedance device connected across a part of said winding to modify the magnitude and phase of the current therein, said part of the winding including coils lying in corresponding positions in different poles of the winding.

3. In an alternating-current single-phase series motor having a stator member and a rotor member, a plurality of motor-winding coils carried by said stator member, said coils being disposed to form a single multi-polar main exciting winding for the motor, means connecting together certain of said coils lying in corresponding positions in different poles of the winding in one coil group, means connecting the remaining coils together in another coil group, means connecting said coil groups together in series, and means connected across at least one of said coil groups for modifying the magnitude and phase of the current in said group.

4. In an alternating-current single-phase series motor having a stator member and a rotor member, a plurality of motor-winding coils carried by said stator member, said coils being disposed to form a single multi-polar main exciting winding for the motor, means connecting together certain of said coils lying in corresponding positions in different poles of the winding in one coil group, means connecting the remaining coils together in another coil group, means connecting said coil groups together in series, and an impedance device connected across at least one of said coil groups for modifying the magnitude and phase of the current in said group.

5. In an alternating-current single-phase series motor having a stator member and a rotor member, a plurality of motor-winding coils carried by said stator member, said coils being disposed to form a single multi-polar main exciting winding for the motor, said coils being connected together in at least two coil groups, each of said coil groups including coils lying in corresponding positions in different poles of the winding, said coil groups being connected together in series, and means connected across at least one of said coil groups for modifying the magnitude and phase of the current in said group.

6. In an alternating-current single-phase series motor having a stator member and a rotor member, a plurality of motor-winding coils carried by said stator member, said coils being disposed to form a single multi-polar main exciting winding for the motor, said coils being connected together in at least two coil groups, each of said coil groups including coils lying in corresponding positions in different poles of the winding, said coil groups being connected together in series, and an impedance device connected across at least one of said coil groups for modifying the magnitude and phase of the current in said group.

7. In an alternating-current, single-phase series motor having a stator member and a rotor member, a plurality of motor-winding coils carried by said stator member, said coils being disposed to form a single multi-polar main exciting winding for the motor, each pole of the winding comprising concentrically arranged coils of different pitch, means connecting all the coils of smaller pitch in all the poles together in one coil group, means connecting all the coils of larger pitch in all the poles together in another coil group, means connecting said coil groups in series, and means connected across at least one of said coil groups for modifying the magnitude and phase of the current in said group.

8. In an alternating-current, single-phase series motor having a stator member and a rotor member, a plurality of motor-winding coils carried by said stator member, said coils being disposed to form a single multi-polar main exciting winding for the motor, each pole of the winding comprising concentrically arranged coils of different pitch, means connecting all the coils of smaller pitch in all the poles together in one coil group, means connecting all the coils of larger pitch in all the poles together in another coil group, means connecting said coil groups in series and an impedance device connected across at least one of said coil groups for modifying the magnitude and phase of the current in said group.

KARL TÖFFLINGER.